US008496292B2

(12) United States Patent
Strassberg

(10) Patent No.: US 8,496,292 B2
(45) Date of Patent: Jul. 30, 2013

(54) ERGONOMIC BENCH

(76) Inventor: Greg Strassberg, Brooklyn, NY (US)

( * ) Notice: Subject to any disclaimer, the term of this patent is extended or adjusted under 35 U.S.C. 154(b) by 502 days.

(21) Appl. No.: 12/699,855

(22) Filed: Feb. 3, 2010

(65) Prior Publication Data

US 2011/0187068 A1 Aug. 4, 2011

(51) Int. Cl.
*B62J 1/00* (2006.01)
*A47C 7/50* (2006.01)

(52) U.S. Cl.
USPC ............... 297/195.11; 297/423.12; 297/423.1

(58) Field of Classification Search
USPC ............... 297/423.1, 423.11, 423.12, 195.11, 297/338; 182/129, 116, 115; 280/32.6, 32.5
See application file for complete search history.

(56) References Cited

U.S. PATENT DOCUMENTS

| | | | | | |
|---|---|---|---|---|---|
| 2,872,252 | A | * | 2/1959 | Konkle | 182/131 |
| 4,072,209 | A | | 2/1978 | Bolis | |
| 4,397,374 | A | | 8/1983 | Rumage et al. | |
| 4,727,958 | A | | 3/1988 | Botello | |
| 4,832,407 | A | * | 5/1989 | Serber | 297/423.12 |
| 4,863,178 | A | * | 9/1989 | Friesen | 280/32.6 |
| 4,867,273 | A | * | 9/1989 | Schaevitz | 182/116 |
| 5,295,728 | A | | 3/1994 | Schaevitz | |
| 5,490,716 | A | * | 2/1996 | Naughton | 297/423.12 |
| 5,857,747 | A | * | 1/1999 | Mundkowski | 297/423.11 |
| 6,105,719 | A | * | 8/2000 | Lensing | 182/116 |
| 6,540,301 | B1 | * | 4/2003 | Bottoms | 297/423.11 |
| 6,595,590 | B2 | * | 7/2003 | Bottoms | 297/423.11 |
| 6,641,146 | B2 | | 11/2003 | Reese | |
| 6,824,149 | B1 | * | 11/2004 | Whitlock et al. | 280/32.6 |
| 6,926,365 | B2 | * | 8/2005 | Bottoms | 297/423.12 |
| 6,957,718 | B1 | * | 10/2005 | Whiteside et al. | 182/115 |
| 7,080,715 | B1 | * | 7/2006 | Bowlin | 182/129 |
| 7,367,623 | B2 | * | 5/2008 | Tholkes et al. | 297/300.8 |
| 2007/0241523 | A1 | | 10/2007 | Lewman | |
| 2007/0262619 | A1 | | 11/2007 | Blemel | |

FOREIGN PATENT DOCUMENTS

FR 2624710 6/1989

OTHER PUBLICATIONS

REL Products, The Topside Creeper, [Retreived from internet on Feb. 22, 2010].

* cited by examiner

*Primary Examiner* — David Dunn
*Assistant Examiner* — Richard Lowry

(57) ABSTRACT

In one aspect, the invention is directed to an ergonomic bench that includes a horizontal base; a vertical support structure; a seat support assembly that is height-adjustable; a chest support assembly that is height-adjustable and pitch-adjustable; a knee support assembly that is height-adjustable; and a heel rest assembly. In one aspect, the ergonomic bench includes wheels and a handle. In one aspect, the ergonomic bench includes a tool tray assembly. In one aspect, the ergonomic bench includes a horizontal base that is sectional. In one aspect, the ergonomic bench includes bumper guards.

11 Claims, 10 Drawing Sheets

ERGONOMIC BENCH

BACKGROUND

1. Field of the Invention

The present invention relates to an apparatus designed to provide a stable platform that is comfortable for a person to use when working on the engine of a vehicle from a position over the engine compartment.

2. Background Discussion

Devices known in the art are designed to suspend a person over the engine compartment of a vehicle for the purpose of working on the engine while eliminating the need to lean on, and risk damaging, the vehicle. However, a need exists for an apparatus that advantageously provides greater user comfort, stability and range of movement than the devices known in the art.

SUMMARY

An object of this invention is an ergonomic bench that positions a person over the engine compartment of a vehicle and provides broad distribution of the person's weight over the person's chest, seat, knees and feet for the purpose of lessening fatigue and relieving stress on vulnerable areas such as the person's lower back and hamstrings, which increases the person's comfort and enables the person to use the ergonomic bench for longer periods of time. Components of the ergonomic bench are adjustable for height and angle and may be extended or lengthened to permit users of different heights and body proportions to customize the configuration of the ergonomic bench for greater comfort and stability.

In certain embodiments, the ergonomic bench includes a horizontal base. In certain embodiments, the profile of the horizontal base is H-shaped, U-shaped, I-shaped or any other configuration suitable to eliminate pitch and roll relative to the longitudinal axis of the ergonomic bench.

In certain embodiments, the horizontal base comprises a front horizontal rail and a rear horizontal rail connected by a transverse crossbar. The low height of the horizontal base allows it to be positioned underneath a vehicle that has minimal ground clearance. The narrow center support provided by the transverse crossbar allows greater freedom in positioning the ergonomic bench to the front or sides of the engine compartment by minimizing interference with the tires of the vehicle. In certain embodiments, risers are attached to the bottom surface of the horizontal base. In certain embodiments, the front horizontal rail and the rear horizontal rail are parallel.

In certain embodiments, the transverse crossbar comprises a front section and a rear section that are adapted to be removably conjoined. In certain embodiments, the front section of the transverse crossbar can be placed in a desired position relative to the rear section of the transverse crossbar and fixed in place in order to facilitate storage of the ergonomic bench or prepare the ergonomic bench for use.

In certain embodiments, the ergonomic bench includes a vertical support structure. In certain embodiments, the profile of the vertical support structure is H-shaped, Y-shaped, T-shaped or any other configuration suitable to provide elevation above the horizontal base and stability.

In certain embodiments, the vertical support structure comprises a front vertical support and a rear vertical support mounted on the horizontal base and a horizontal support connecting the front vertical support with the rear vertical support. In certain embodiments, the front vertical support and the rear vertical support are parallel. In certain embodiments, the front vertical support and the rear vertical support are mounted on the rear section of the transverse crossbar.

In certain embodiments, the ergonomic bench includes a seat support assembly. In certain embodiments, the seat support assembly comprises a seat support member. In certain embodiments, the seat support member comprises a seat platform attached to the front vertical support and a seat pad mounted on the seat platform. In certain embodiments, the mechanism by which the seat support member is attached to the front vertical support is adapted to permit a person to remove the seat support member from the front vertical support and to vertically reposition the seat support member along the length of the first vertical support for the purpose of adjusting the height of the seat support member relative to the horizontal base. In certain embodiments, the seat support member comprises a roller mechanism that can be fixed in position on the front vertical support by friction between the roller mechanism and the front vertical support. In certain embodiments, the seat support member further a collar that can be fixed in position on the front vertical support using a latching mechanism.

In certain embodiments, the ergonomic bench includes a chest support assembly. In certain embodiments, the chest support assembly comprises a front post that is coupled to the front vertical support and a chest support member that is attached to the front post. In certain embodiments, the chest support member comprises a chest platform and a chest pad mounted on the chest platform. In certain embodiments, the chest support member can be positioned at a desired height relative to the horizontal base. In certain embodiments, the mechanism by which the chest support member is attached to the front post is adapted to permit a person to adjust the pitch of the chest support member and to fix the pitch of the chest support member at a selected angle. In certain embodiments, the chest support member comprises rails and a bracket that are configured to allow a user of the ergonomic bench to extend the chest support member away from the point of attachment of the chest support member to the front post. In certain embodiments, the chest support member comprises a telescoping portion that is configured to allow a user of the ergonomic bench to extend the chest support member away from the point of attachment of the chest support member to the front post. In certain embodiments, the front post is inserted into the front vertical support and slides freely therein.

In certain configurations, the configuration of the ergonomic bench with the chest platform and the seat platform being attached to the single front vertical support provides a narrow longitudinal profile. The narrow profile allows a person to mount and dismount the ergonomic bench more easily and provides an unobstructed lateral range of motion for the person. A narrow chest pad additionally provides the person with greater range of motion and reach into the engine compartment.

In certain embodiments, the ergonomic bench includes a tool tray assembly that may be attached to the ergonomic bench in a manner permitting a person to freely adjust the position of the tool tray. The tool tray may be attached in a right-hand or left-hand configuration relative to a person using the ergonomic bench and may be removed as desired.

In certain embodiments, the ergonomic bench includes a knee support assembly. In certain embodiments, the knee support assembly comprises a rear post that is coupled to the rear vertical support and a knee support member that is attached to the rear post. In certain embodiments, the knee support member comprises a knee platform and one or more knee pads mounted on the knee platform. In certain embodiments, the knee support member can be positioned at a desired height relative to the horizontal base. The knee pads may have a concave and cupped shape to provide greater comfort for a person using the ergonomic bench and to prevent the person from sliding forward toward the vehicle when positioned on the ergonomic bench. In certain embodiments, the rear post is inserted into the rear vertical support and slides freely therein.

In certain embodiments, the ergonomic bench includes heel rest assembly. In certain embodiments, the heel rest assembly comprises a heel rest bar that may be attached to the knee platform or to the rear post and may be removed as desired and a heel rest member. In certain embodiments, the heel rest member comprises a heel rest platform mounted on the heel rest bar and one or more heel pads mounted on the heel rest platform. The shape of the heel rest bar is configured to provide vertical clearance between the heel pad and the knee pad so that, when a person uses the ergonomic bench, the person's knee and shin rest on top of the knee pad and the heel of the person's foot rests underneath, and is held in place by, the heel pad. When the person leans forward to reach into the engine compartment, the heel rest provides additional leverage and stability.

In certain embodiments, the ergonomic bench includes latching mechanisms, such as pins or rods, and holes present in the front vertical support, the front post, the rear vertical support and the rear post. In certain embodiments, one pair of opposing holes is present in each of the front vertical support and the rear vertical support. In certain embodiments, multiple opposing holes are positioned along the length of the front post and the rear post. When the front post is inserted into the front vertical support, selected holes in the front post may be aligned with the holes in the front vertical support and a latching mechanism may be inserted through the holes in both the front post and the front vertical support, thereby fixing the front post in position relative to the front vertical support. A person using the ergonomic bench may adjust the height of the chest pad and the chest platform attached to the front post by selecting holes at different positions along the length of the front post to be aligned with the holes in the front vertical support and fixing the front post at different positions relative to the front vertical support. The height of the knee pad and the knee platform attached to the rear post may be adjusted in the same fashion.

In certain embodiments, the ergonomic bench includes wheels mounted on the horizontal base in a slightly raised configuration and a handle mounted on the ergonomic bench so that a person can easily move the ergonomic bench by grasping the handle and tilting and pivoting the ergonomic bench onto the wheels.

In certain embodiments, the ergonomic bench includes bumper guards attached to the chest platform or the front vertical support, or both. The bumper guards are adapted to protect a vehicle from damage by preventing the chest platform and the front vertical support from coming into contact with the vehicle when the ergonomic bench is in use.

Other systems, methods, features, and advantages of this invention will be, or will become, apparent to one with skill in the art upon examination of the following figures and detailed description. It is intended that all such additional systems, methods, features, and advantages be included within this description, be within the scope of the invention, and be protected by the appended claims.

BRIEF DESCRIPTION OF THE DRAWINGS

These and other features, aspects and advantages of this invention will become better understood with regard to the following description, appended claims and accompanying drawings where:

DESCRIPTION

Figure 1:
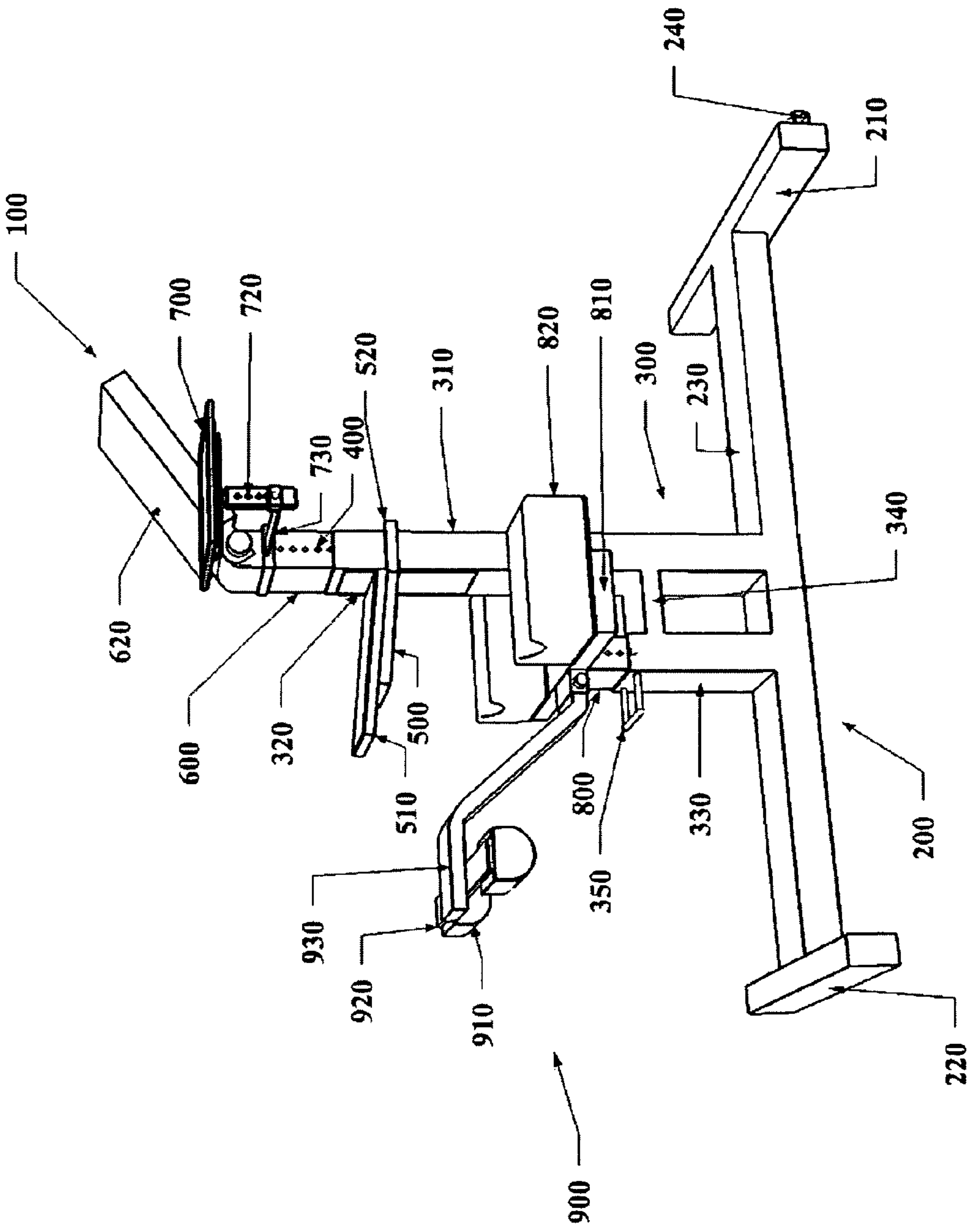
FIG. 1 shows a perspective view of an embodiment of the present invention.
Figure 2:
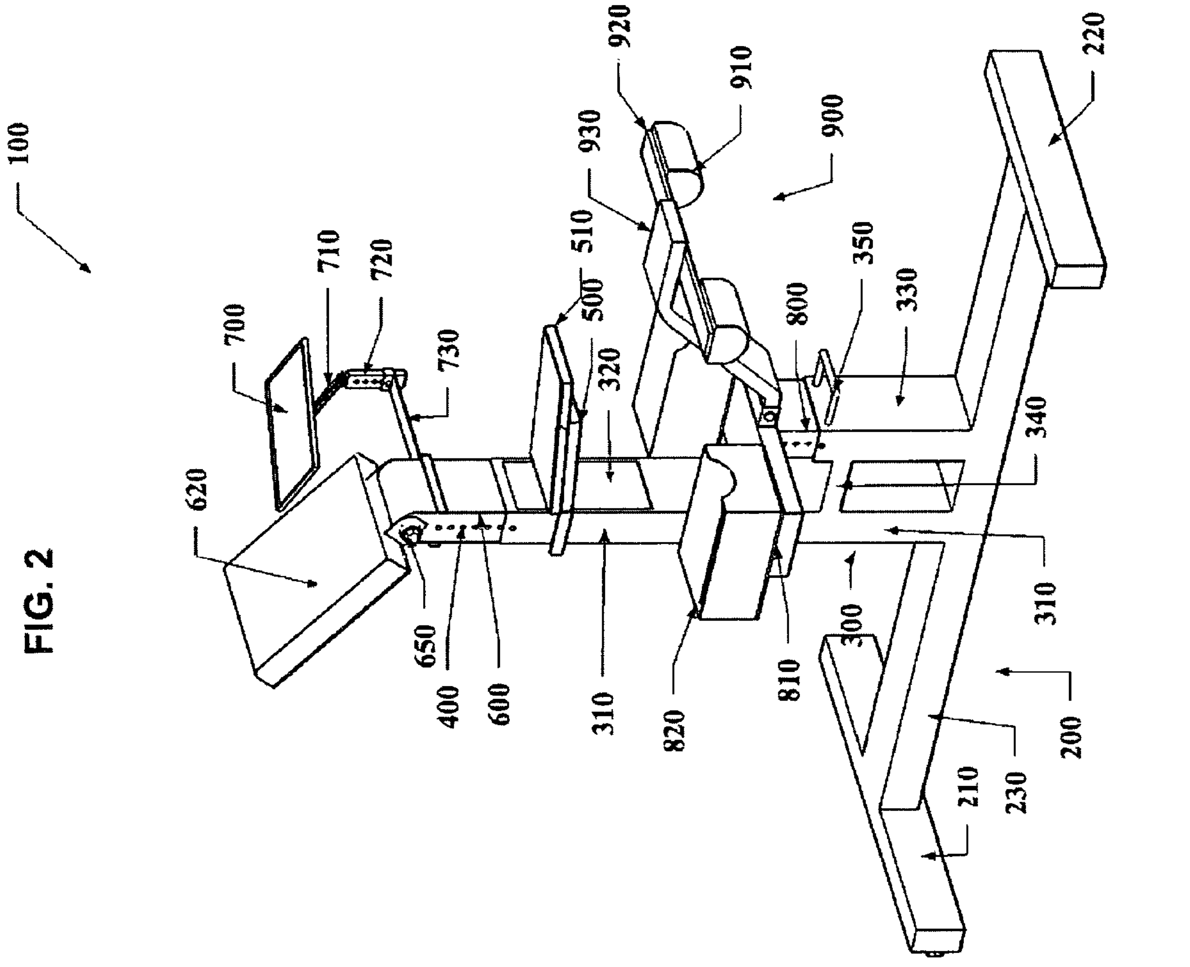
FIG. 2 shows a perspective view of an embodiment of the present invention.
Figure 3:
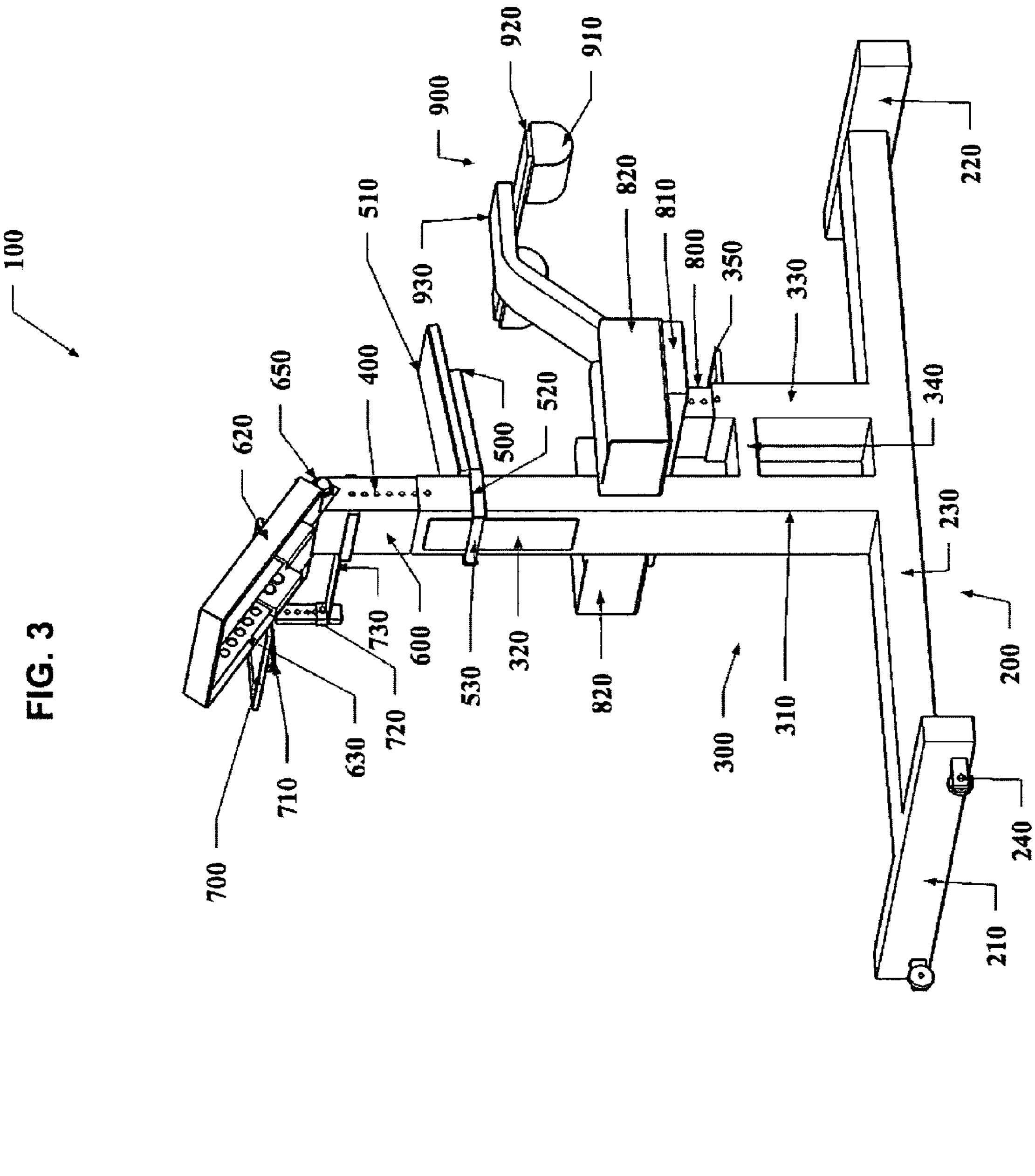
FIG. 3 shows a perspective view of an embodiment of the present invention.
Figure 4:
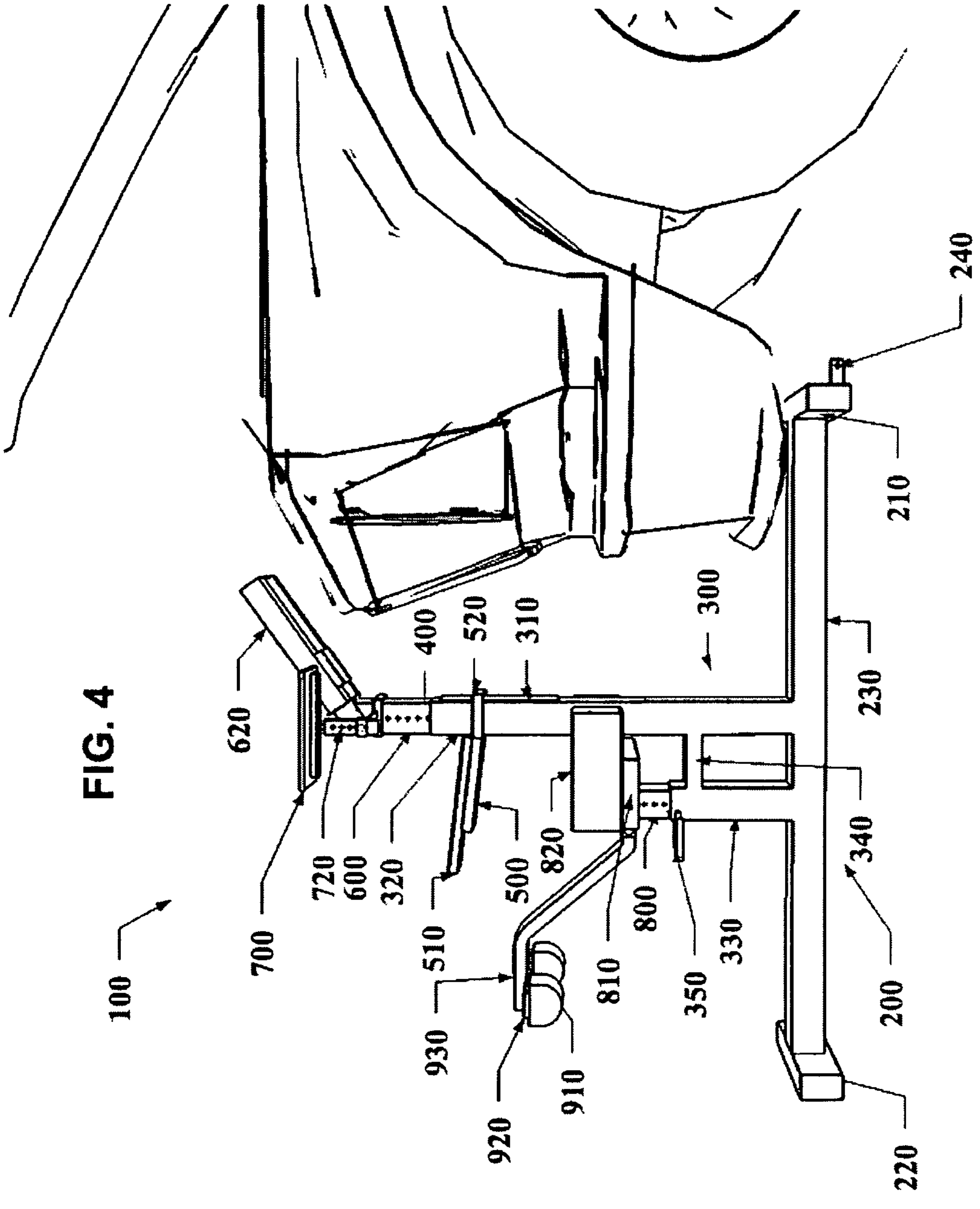
FIG. 4 shows a side view of an embodiment of the present invention in position to be used by a person to work on the engine of a vehicle.
Figure 5:
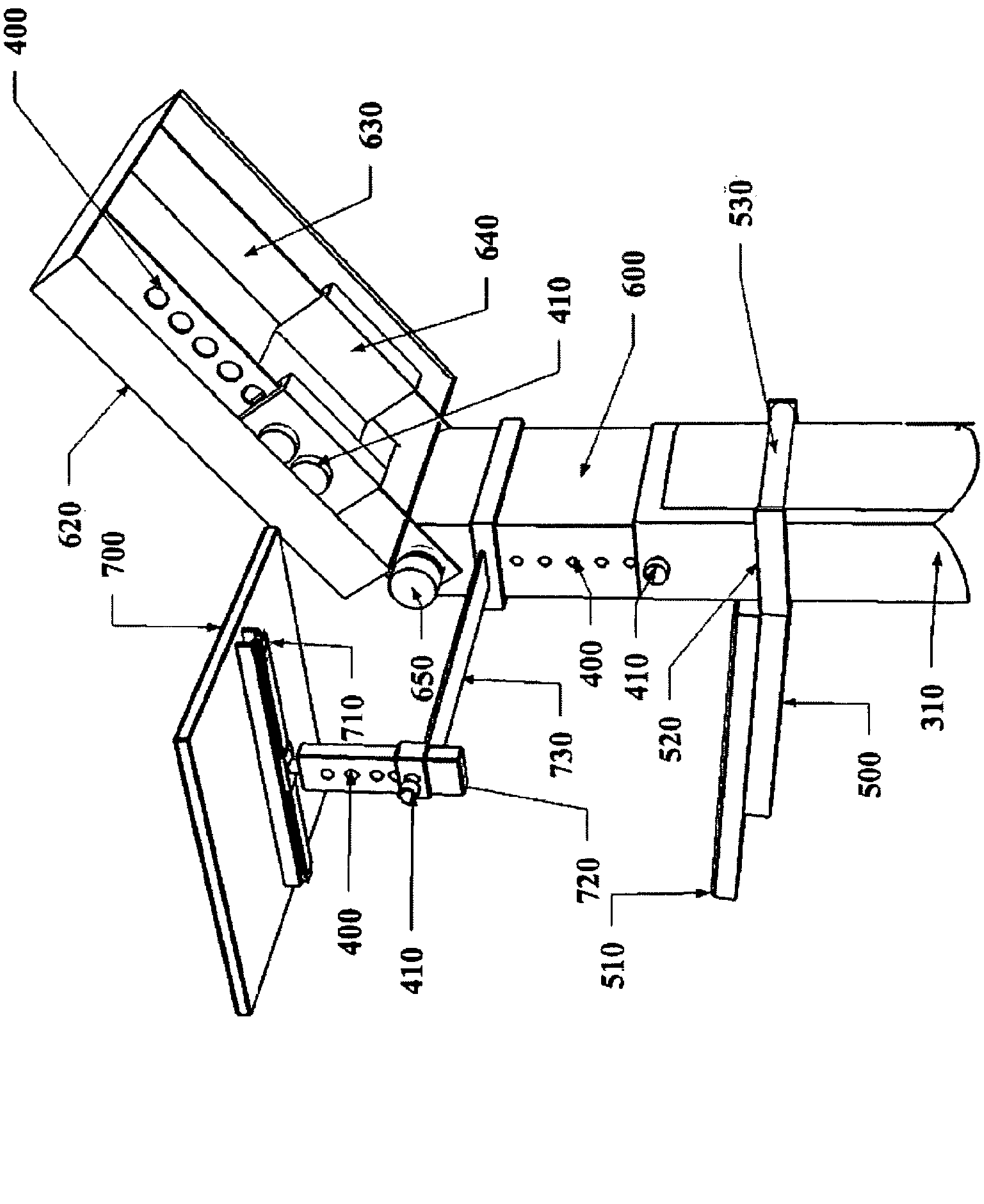
FIG. 5 shows a fragmented, perspective view of an embodiment of the present invention.
Figure 6:
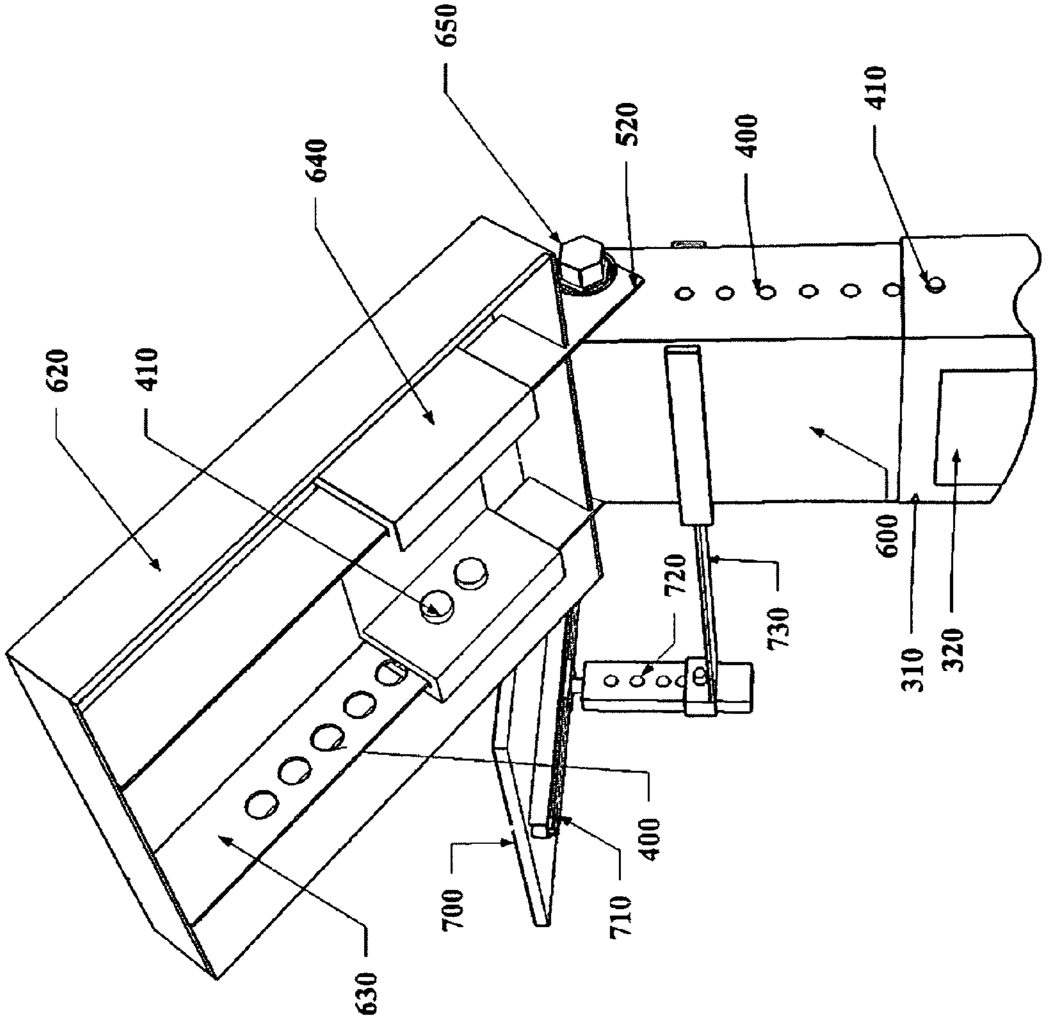
FIG. 6 shows a fragmented, perspective view of an embodiment of the present invention.
Figure 7:
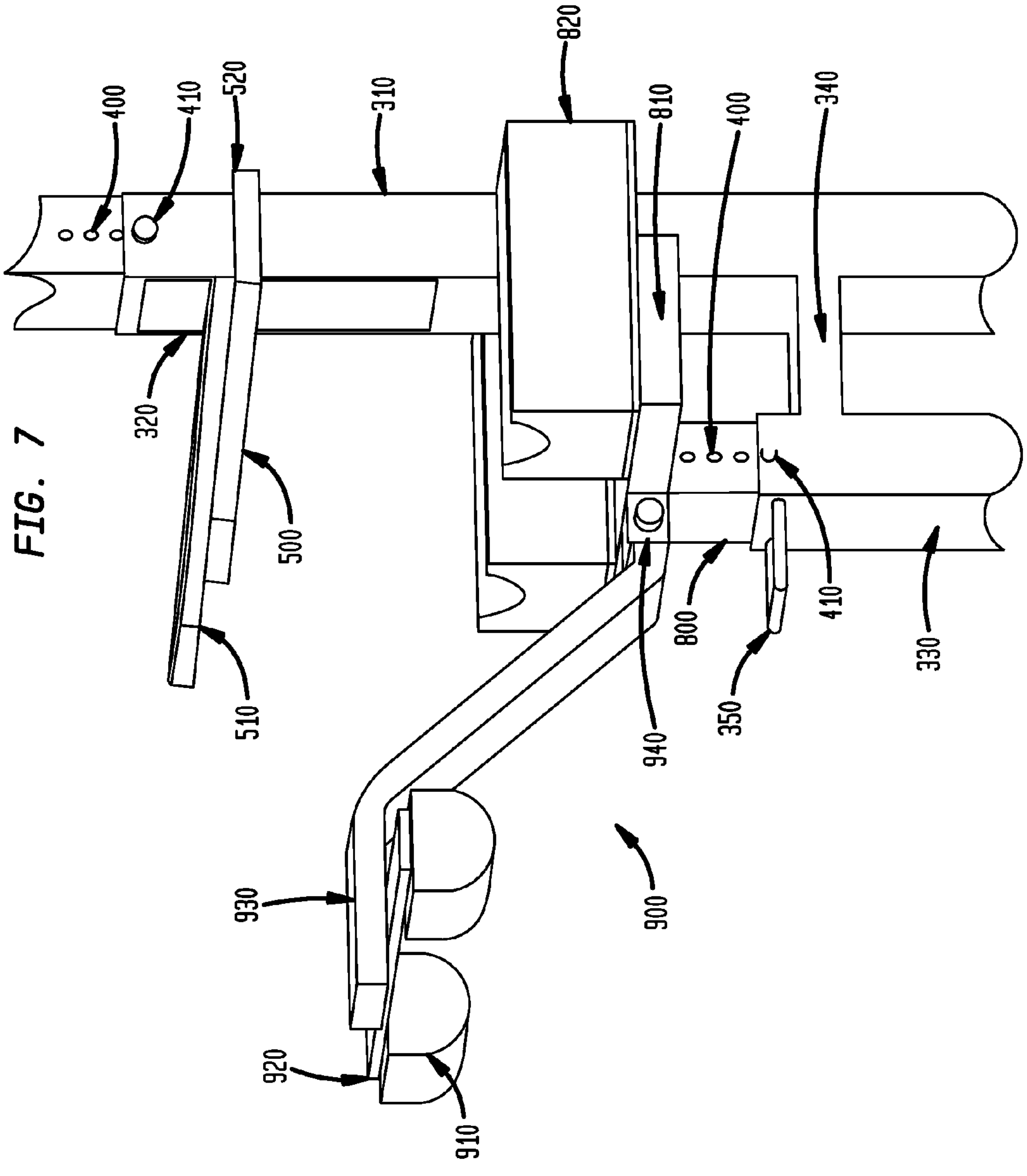
FIG. 7 shows a fragmented, perspective view of an embodiment of the present invention.

As shown in FIG. 1, FIG. 2, FIG. 3, FIG. 4, FIG. 5, FIG. 6 and FIG. 7, in certain embodiments, an ergonomic bench 100 includes a horizontal base 200 that is designed to rest on a substantially flat floor surface and provide stable support. The horizontal base 200 includes a front support rail 210, which is placed underneath the engine compartment or body portion of a vehicle, a rear support rail 220 and a transverse crossbar 230. The support rails 210 and 220 are connected by the transverse crossbar 230 generally in an I-shaped configuration, with the transverse crossbar 230 generally being longer than either of the support rails 210 and 220.

In certain embodiments, the front support rail 210 and the rear support rail 220 are parallel. In certain embodiments, the front support rail 210 is longer than the rear support rail 220 in order to increase lateral stability and reduce roll when a person using the ergonomic bench 100 leans forward, placing the person's center of gravity closer to the front support rail 210 than the rear support rail 220.

In certain embodiments, the transverse crossbar 230 is attached to the front support rail 210 and the rear support rail 220 such that the bottom surface of the transverse crossbar 230 is not flush with the bottom surfaces of the front support rail 210 and the rear support rail 220. In certain embodiments, the transverse crossbar 230 is attached to the front support rail 210 and the rear support rail 220 such that, when the bottom surfaces of the front support rail 210 and the rear support rail 220 are in contact with a floor surface, the bottom surface of the transverse crossbar 230 is not in contact with the floor surface, thereby providing vertical clearance between the bottom surface of the transverse crossbar 230 and the floor surface in order to accommodate irregularities or non-flat portions of the floor surface while permitting the bottom surfaces of the front support rail 210 and the rear support rail 220 to provide stability.

In certain embodiments, the ergonomic bench 100 further includes a vertical support structure 300 that provides elevation for a person using the ergonomic bench 100. The vertical support structure 300 includes a front vertical support 310, which is proximal to a vehicle when the ergonomic bench 100 is in use, a rear vertical support 330 and a horizontal support 340. The front vertical support 310 and rear vertical support 330 are mounted on the transverse crossbar 230 and are connected by the horizontal support 340 generally in an H-shaped configuration, with the horizontal support 340 being shorter than either of the vertical supports 310 and 330 and the front vertical support 310 being longer than the rear vertical support 330. In certain embodiments, holes 400 through which a suitable latching mechanism 410 such as a pin, rod or bolt may be inserted are present in alignment on opposing sides of the length of the front vertical support 310 and the rear vertical support 330.

In certain embodiments, the transverse crossbar 230 is sufficiently elongated and the vertical support structure 300 is mounted on the transverse crossbar 230 sufficiently toward the rear support rail 220 to allow a person to position the front support rail 210 substantially underneath a vehicle to increase the stability of the ergonomic bench 100 when in use.

In certain embodiments, wheels 240 are attached to an outboard face or edge of the front support rail 210 to permit a user to roll the ergonomic bench 100 on a floor surface. The wheels 240 may be attached to the front support rail 210 at elevated points so that the wheels 240 are in contact with the floor surface only when the ergonomic bench 100 is tilted toward the front support rail 210. In certain embodiments, a handle 350 is mounted on the rear vertical support 330, providing means for a person to securely and comfortably grasp the ergonomic bench 100 and tilt the ergonomic bench 100 onto the wheels 240 in order to reposition the ergonomic bench 100.

In certain embodiments, the ergonomic bench 100 further includes a seat support member. In certain embodiments, the seat support member comprises a seat platform 500 and a seat pad 510 mounted on the top side of the seat platform 500. When a person is seated on the ergonomic bench 100, the seat platform 500 and the seat pad 510 are oriented horizontally or with the top side of the seat pad 510 pitched slightly toward the front vertical support 310.

In certain embodiments, the seat platform 500 is removably attached to the front vertical support 310 and is height-adjustable through a continuous range along the length of the front vertical support 310. In certain embodiments, the seat platform 500 comprises extension arms 520 connected by a rotating roller mechanism 530 that together encompass the cross-sectional circumference of the front vertical support 310, and the front vertical support 310 comprises a non-slip coating 320 or material present on one or more surfaces of the front vertical support 310, such that a user may adjust the height of the seat platform 500 by tilting a rear edge of the seat platform 500 toward the top of the front vertical support 310, vertically repositioning the seat platform 500 using the roller mechanism and tilting the rear edge of the seat platform 500 toward the bottom of the front vertical support 310. A person using the ergonomic bench 100 can thus vertically reposition the seat platform 500 by varying the pitch of the seat platform 500, and the non-slip coating 320 or material present on the surface of the front vertical support 310 prevents the seat platform 500 from sliding downward when the rear edge of the seat platform 500 is tilted toward the bottom of the front vertical support 310 and the person is seated on the seat platform 500.

In certain embodiments, the ergonomic bench 100 further includes a front post 600 that is slidably inserted within the front vertical support 310 in a telescopic fashion and a chest support member attached to the front post 600 at or near the top of the front post 600. In certain embodiments, the chest support member comprises a chest platform 610 and a chest pad 620 mounted to the chest platform 610. In certain embodiments, holes 400 through which a suitable latching mechanism 410 such as a pin, rod or bolt may be inserted are present along the length of the front post 600 and are configured to be aligned with the holes 400 in the front vertical support 310. A person may adjust the height of the chest platform 610 and chest pad 620 by sliding the front post 600 upward or downward within the front vertical support 310, aligning the holes 400 in the front post 600 with the holes 400 present in the front vertical support 310 and inserting the latching mechanism 410 through the holes 400 in the front post 600 and the front vertical support 310 to lock the front post 600 in place relative to the front vertical support 310.

In certain embodiments, the chest platform 610 comprises extension arms 520 having holes 400 configured to be aligned with one or more holes 400 present in the front post 600 and an attachment bolt 650 adapted to be inserted through holes 400 present in the extension arms 520 and holes 400 present in the front post 600. In certain embodiments, the cross-sectional shape of the attachment bolt 650 is polygonal. In certain embodiments, holes 400 present in the extension arms 520 and holes 400 present in the front post 600 have a polygonal shape corresponding to the cross-sectional shape of the attachment bolt 650. In certain embodiments, a person using the ergonomic bench 100 may removably attach the chest platform 610 to the front post 600 and adjust and fix the pitch of the chest platform 610 by aligning the holes 400 present in the extension arms 520 with the holes 400 present in the front post 600, rotating the chest platform 610 about the axis passing through the holes 400 present in the extension arms 520 and the holes 400 present in the front post 600 to position the chest platform 610 at the desired pitch, and inserting the attachment bolt 650 through the holes 400 present in the extension anus 520 and the holes 400 present in the front post 600, so that the polygonal cross-section of the attachment bolt 650 cooperates with the corresponding polygonal shape of the holes 400 present in the extension arms 520 and the holes 400 present in the front post 600 to hold the chest platform 610 in place and prevent the chest platform 610 from rotating about the longitudinal axis of the attachment bolt 650.

In certain embodiments, the chest platform 610 comprises chest support rails 630 and a bracket 640, wherein the chest pad 620 is mounted on the bracket 640 and the chest pad 620 and bracket 640 are adapted to cooperate with and slide along the length of the chest support rails 630. In certain embodiments, holes 400 are present along the length of at least one of the chest support rails 630 and in the bracket 640 such that the holes 400 present in the bracket 640 may be aligned with the holes 400 present in the chest support rail 630. In certain embodiments, a person using the ergonomic bench 100 may position the chest pad 620 closer to the front support rail 210 in order to provide greater reach into an engine compartment by sliding the chest pad 620 mounted on the bracket 640 along the length of the chest support rails 630 to a desired position, aligning the holes 400 present in the bracket 640 with the holes 400 present in the chest support rail 630, and inserting latching mechanisms 410 through the holes 400 present in the bracket 640 and the holes 400 present in the chest support rail 630, such that the chest support rails 630, bracket 640 and latching mechanism 410 in cooperation form a rigid structure holding the chest pad 620 in the desired position.

In certain embodiments, the ergonomic bench 100 further includes a tool tray assembly attached to the front vertical support 310, the front post 600, the chest platform 610 or any other suitable location on the ergonomic bench 100. In certain embodiments, the tool tray assembly comprises a tool tray 700 that is substantially planar. In certain embodiments, the tool tray 700 is magnetic so as to improve retention of tools or other metallic items on the top surface of the tool tray 700.

In certain embodiments, the tool tray 700 is mounted on an extendible rod 710. In certain embodiments, the extendible rod 710 comprises a pair of rails, wherein the tool tray 700 is mounted on one rail, which is slidably attached to the other rail to provide extension of the extendible rod 710. In certain embodiments, the extendible rod 710 is mounted on a vertical tray support post 720, and the extendible rod 710 is configured to rotate freely about the mounting point on the vertical tray support post 720. In certain embodiments, the extendible rod 710 is configured to slide along its length in cooperation with the mounting point on the vertical tray support post 720. In certain embodiments, holes 400 are present along the length of the vertical tray support post 720. In accordance with this embodiment, the vertical tray support post 720 is removably attached to a tray attachment arm 730, which is removably attached to the front post 600. Latching mechanisms 410 may be inserted through the holes 400 present in the vertical tray support post 720 and the front post 600 to removably attach the tray attachment arm 730 to the vertical tray support post 720 and the front post 600 and to vertically reposition the tray attachment arm 730 and the vertical tray support post 720.

In certain embodiments, the ergonomic bench 100 further includes a rear post 800 that is slidably inserted within the rear vertical support 330 in a telescopic fashion and a knee support member mounted at or near the top of the rear post 800. In certain embodiments, the knee support member comprises a knee platform 810 and one or more knee pads 820 mounted to the knee platform 810. The knee pad 820 is mounted in an offset position to the side of the plane described by the longitudinal axes of the rear vertical support 330 and the transverse crossbar 230 in order to provide comfortable ergonomic positioning when a person is seated on the ergonomic bench 100 with the knee and shin of one leg resting on the knee pad 820.

In certain embodiments, holes 400 through which a suitable latching mechanism 410 such as a pin, rod or bolt may be inserted are present along the length of the rear post 800 and are configured to be aligned with the holes 400 in the rear vertical support 330. A person may adjust the height of the knee platform 810 and knee pad 820 by sliding the rear post 800 upward or downward within the rear vertical support 330, aligning the holes 400 in the rear post 800 with the holes 400 present in the rear vertical support 330 and inserting the latching mechanism 410 through the holes 400 in the rear post 800 and the rear vertical support 330 to lock the rear post 800 in place relative to the rear vertical support 330.

In certain embodiments, the ergonomic bench 100 further includes a heel rest assembly 900 that provides additional comfort, support and stability when a person uses the ergonomic bench 100. In certain embodiments, the heel rest assembly 900 comprises a heel rest member attached to a heel rest bar 930. In certain embodiments, the heel rest member comprises one or more heel pads 910 mounted on a heel rest platform 920. The heel rest platform 920 is mounted on a heel rest bar 930, and the heel rest bar 930 is removably attached to the rear post 800. In certain embodiments, the heel rest bar 930 is inserted into a socket 940 disposed upon the knee platform 810 or the rear post 800, and alignable holes 400 are present on the socket 940 and on the heel rest bar 930 through which a latching mechanism 410 is inserted to removably attach the heel rest bar 930 to the ergonomic bench 100.

When a person sits on the seat pad 510 of the ergonomic bench 100 and rests the knee and shin of one leg on the knee pad 820, the person's lower leg extends horizontally toward the rear horizontal rail. Accordingly, the heel rest bar 930 may be shaped appropriately, for example in a modified discontinuous S-shape, to provide vertical clearance between the top of the knee pad 820 and the bottom of the heel pad 910 so that the heel of the person's foot will be positioned underneath the heel pad 910 and held in place.

Figure 8:
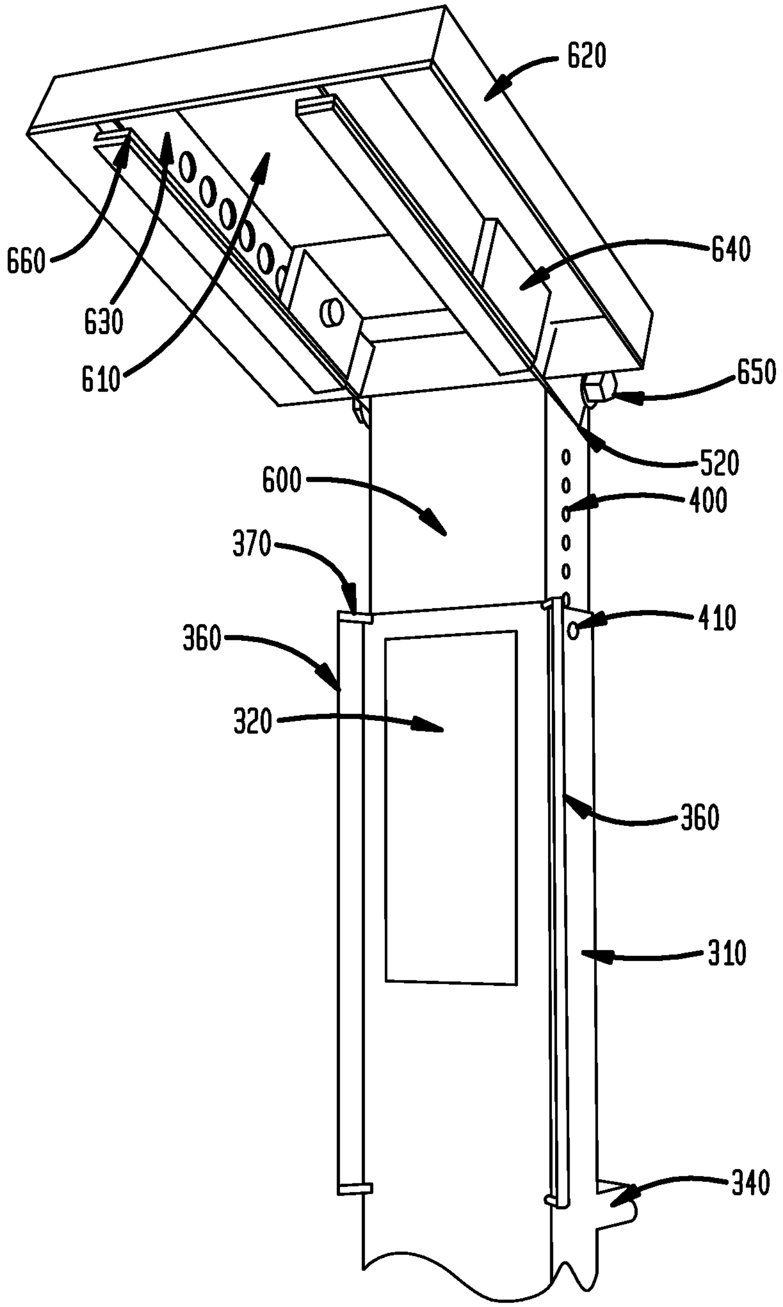
FIG. 8 shows a fragmented, perspective view of an embodiment of the present invention.

As shown in FIG. 8, in certain embodiments, the chest pad 620 may be fixed in position by inserting a latching mechanism 410 through holes 400 present in the bracket 640 and the chest support rail 630. In certain embodiments, a chest support bumper guard 660 is mounted on a downwardly-protruding portion of the bracket 640 or on a chest support rail 630 using adhesive, mechanical fasteners or any other suitable means known to one of ordinary skill. When the ergonomic bench 100 is positioned next to a vehicle, the chest support bumper guard 660 prevents the bracket 640 and chest support rails 630 from scratching or otherwise damaging the vehicle. The chest support bumper guard 660 may be made from soft rubber, foam or any other material suitable to provide cushioning and/or protection.

As shown in FIG. 8, in certain embodiments, front vertical support bumper guards 360 are mounted on the front vertical support 310. The front vertical support bumper guards 360 prevent the front vertical support 310 from scratching or otherwise damaging a vehicle positioned next to the ergonomic bench 100. The front vertical support bumper guards 360 may be mounted on bumper guard mounts 370 that are mounted on, and protrude from, the front vertical support 310 such that the rotating roller mechanism 530 can be vertically repositioned freely on the front vertical support 310 without interference from the front vertical support bumper guards 360. The front vertical support bumper guards 360 may be made from soft rubber, foam or any other material suitable to provide cushioning and/or protection.

Figure 9:
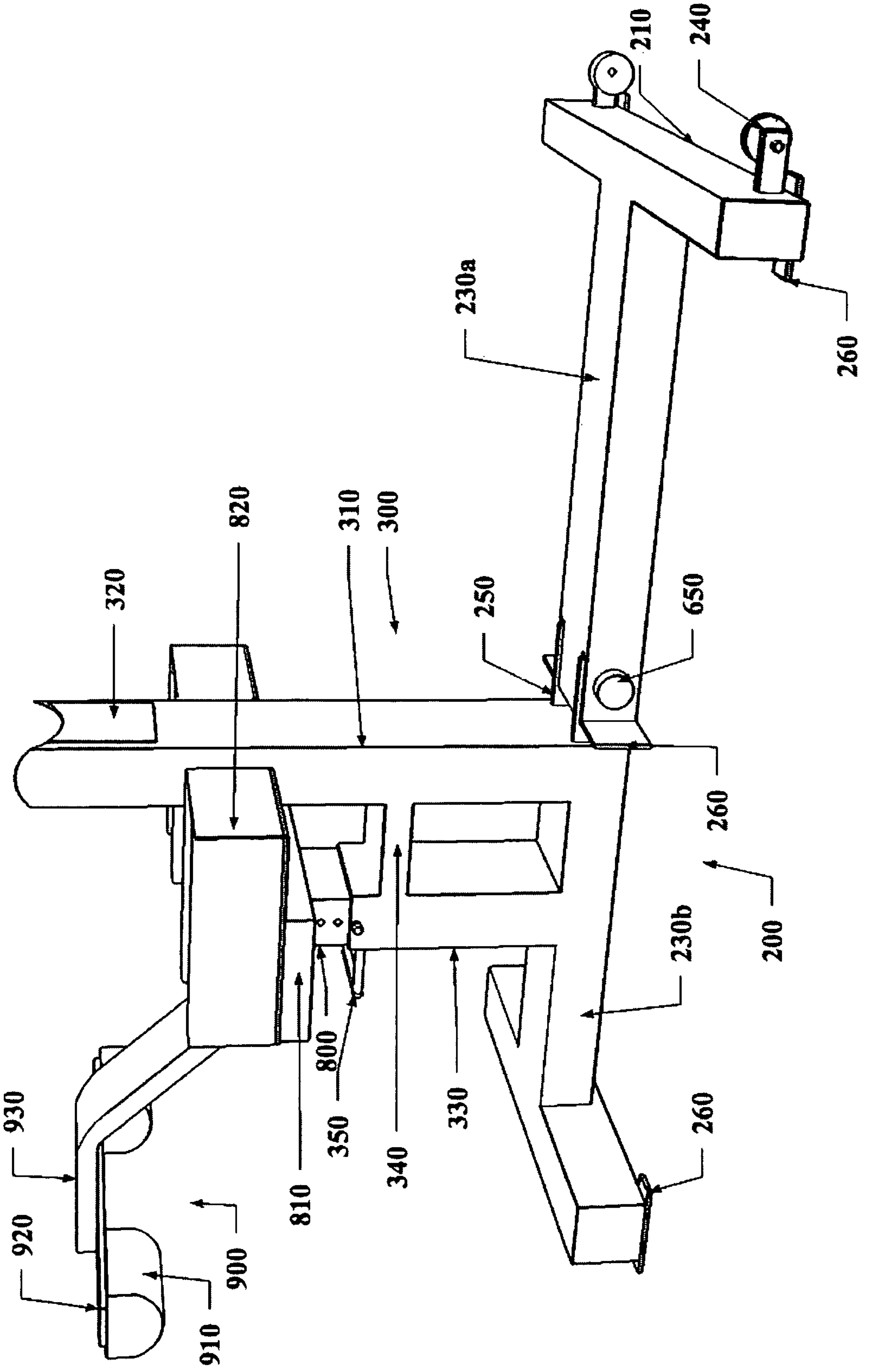
FIG. 9 shows a fragmented, perspective view of an embodiment of the present invention.
Figure 10:
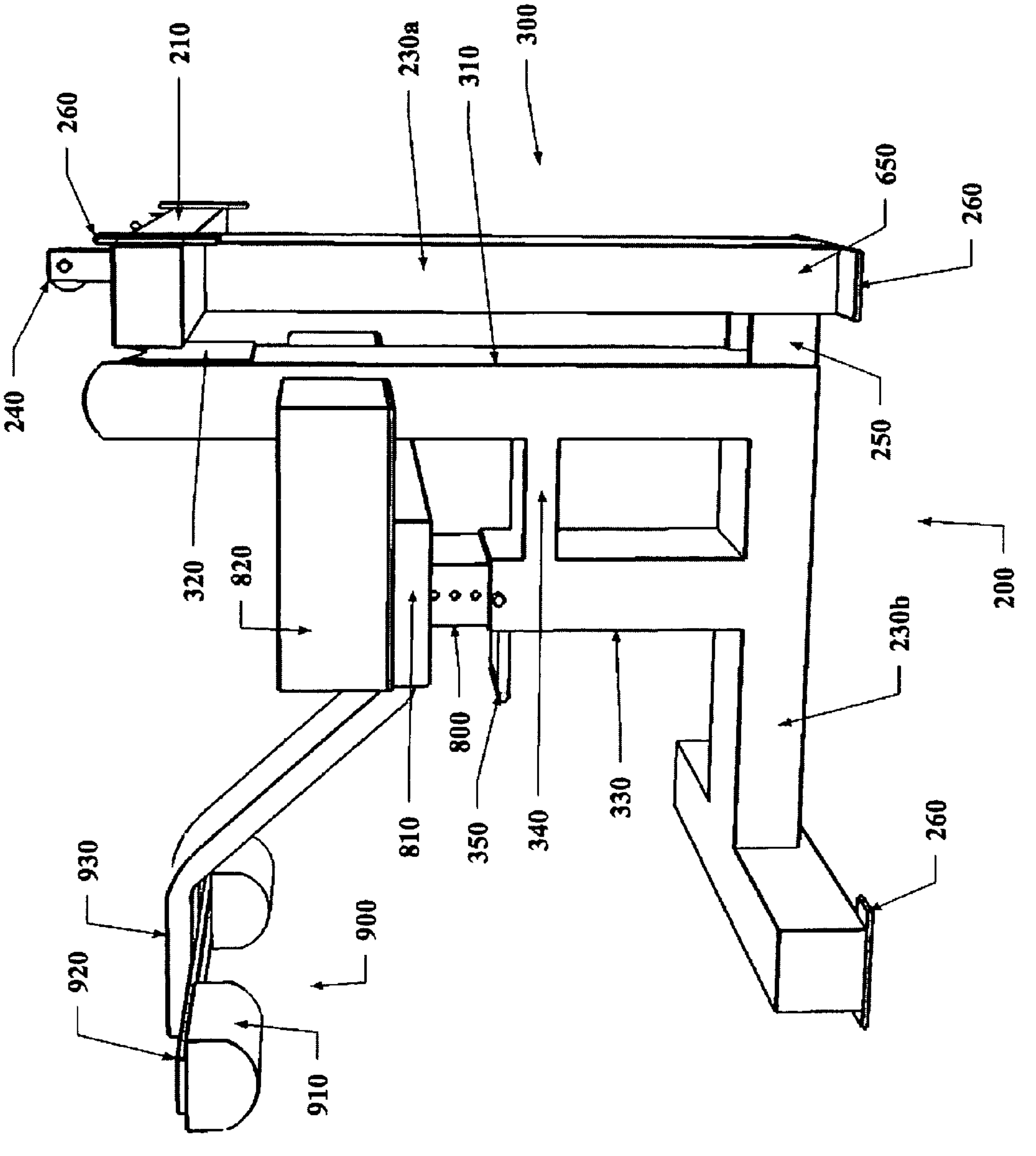
FIG. 10 shows a fragmented, perspective view of an embodiment of the present invention.

As shown in FIG. 9 and FIG. 10, in certain embodiments, the transverse crossbar 230 may comprise a front transverse crossbar 230*a* and a rear transverse crossbar 230*b* assembled and operating in cooperation. In certain embodiments, the vertical support structure 300 is mounted on the rear transverse crossbar 230*b*.

As shown in FIG. 10, a person using the ergonomic bench 100 can detach the front transverse crossbar 230*a* from the rear transverse crossbar 230*b* and can position the front transverse crossbar 230*a* in a folded position for ease of storing the ergonomic bench 100. In certain embodiments, flaps 250 are mounted on, and protrude from, the rear transverse crossbar 230*b* and fit into corresponding slots formed in the front transverse crossbar 230*a*. Holes 400 present in the flaps 250 and the front transverse crossbar 230*a* can be aligned. An attachment bolt 650 is inserted through holes 400 present in the flaps 250 and in the front transverse crossbar 230*a* in alignment to removably attach the front transverse crossbar 230*a* to the rear transverse crossbar 230*b*.

In certain embodiments, the cross-sectional shape of the attachment bolt 650 is polygonal, and the holes 400 present in the flaps 250 and in the front transverse crossbar 230*a* have a corresponding polygonal shape, so that the polygonal cross-section of the attachment bolt 650 cooperates with the corresponding polygonal shape of the holes 400 present in the flaps 250 and in the front transverse crossbar 230*a* to hold the front transverse crossbar 230*a* in place relative to the rear transverse crossbar 230*b* and prevent the front transverse crossbar 230*a* from rotating about the longitudinal axis of the attachment bolt 650 when the front transverse crossbar 230*a* is attached to the rear transverse crossbar 230*b*.

In certain embodiments, risers 260 are attached to the bottom surfaces of the front support rail 210 and the rear support rail 220 and provide vertical clearance over irregularities present on the floor surface in order to provide improved stability of the ergonomic bench 100. In certain embodiments, risers 260 are attached to rear end of the front transverse crossbar 230_a_ and provide vertical clearance when the front transverse crossbar 230_a_ is placed in a folded position relative to the rear transverse crossbar 230_b_.

In certain embodiments, the rail members 210 and 220, support members 310 and 320, post members 600 and 800, transverse crossbar 230, horizontal support 340, flaps 250, risers 260, latching mechanisms 410, extension aims 520, chest support rails 630, bracket 640, attachment bolts 650 tool tray 700, extendible rod 710, vertical tray support post 720, tray attachment arm 730, knee platform 810, heel rest platform 920 and heel rest bar 930 are made from steel or other suitable materials that are rigid, durable and capable of supporting significant weights. In certain embodiments, the rail members 210 and 220, support members 310 and 320 and post members 600 and 800 are hollow, and the support members 310 and 320 and post members 600 and 800 have circular, oval or polygonal cross-sectional profiles as suitable to facilitate telescoping configurations that resist rotation of the telescoping post members 600 and 800 when fixed in position. In certain embodiments, the chest pad 620, seat pad 510, knee pads 820 and heel pads 910 are made from rubber, plastic, vinyl-covered foam or other materials suitable to provide durable cushioning.

One of ordinary skill will understand that the description of mounting, attaching or coupling various components or members of the present invention includes all suitable reversible, removable and permanent modes of mounting, attaching and coupling.

Although the present invention has been described in considerable detail with reference to certain embodiments thereof, other embodiments are possible. Therefore, the spirit and scope of the appended claims should not be limited to the description of the embodiments contained therein.

What is claimed is:

1. An ergonomic bench to assist a person working on the engine of a vehicle comprising:

(a) a horizontal base comprising a front horizontal rail and a rear horizontal rail connected by a transverse crossbar;

(b) a vertical support structure comprising a front vertical support, a rear vertical support and a horizontal support connecting the front vertical support with the rear vertical support and wherein the front vertical support and the rear vertical support are each mounted on the transverse crossbar;

(c) a seat support assembly comprising a seat support member attached to the front vertical support, wherein the seat support assembly is adjustable for positioning the seat support member at a desired height above the horizontal base;

(d) a chest support assembly comprising a front post coupled with the front vertical support and a chest support member attached to the front post, wherein the chest support assembly is adjustable for positioning the chest support member at a desired height above the horizontal base and wherein the attachment of the chest support member to the front post is adjustable for positioning the chest support member at a desired pitch;

(e) a knee support assembly comprising a rear post coupled with the rear vertical support and a knee support member mounted to the rear post, wherein the knee support assembly is adjustable for positioning the knee support member at a desired height above the horizontal base; and (f) a heel rest assembly comprising a heel rest bar attached to the knee support member and a heel rest member mounted on the heel rest bar, wherein the heel rest bar is configured to provide vertical clearance between the heel rest member and the knee support member.

2. The ergonomic bench of claim 1, further comprising latching mechanisms and holes present in the front vertical support, the front post, the rear vertical support and the rear post, wherein (a) the front post is adapted to be slidably inserted within the front vertical support;

(b) the rear post is adapted to be slidably inserted within the rear vertical support;

(c) the holes present in the front post are alignable with the holes present in the front vertical support;

(d) the holes present in the rear post are alignable with the holes present in the rear vertical support; and (e) the latching mechanisms cooperate with the holes present in the front vertical support, the front post, the rear vertical support and the rear post for positioning the chest platform and the knee platform at a desired height above the horizontal base.

3. The ergonomic bench of claim 1, wherein the chest support member is adapted to extend radially from the point at which the chest support member is attached to the front post.

4. The ergonomic bench of claim 1, further comprising a tool tray assembly comprising an extension arm pivotally and rotatably attached to the chest support assembly.

5. The ergonomic bench of claim 1, further comprising wheels attached to the horizontal base and a handle attached to the vertical support structure.

6. The ergonomic bench of claim 1, wherein the front horizontal rail and the rear horizontal rail are substantially parallel.

7. The ergonomic bench of claim 1, wherein the front vertical support and the rear vertical support are substantially parallel.

8. The ergonomic bench of claim 1, further comprising a bumper guard attached to the chest support member.

9. The ergonomic bench of claim 1, further comprising a bumper guard attached to the front vertical support.

10. The ergonomic bench of claim 1, wherein the transverse crossbar comprises a front section and a rear section and wherein the front section is adapted to be attached to the rear section and fixed in a desired position relative to the rear section.

11. The ergonomic bench of claim 1, further comprising risers attached to the horizontal base.

* * * * *